United States Patent [19]

Lafont

[11] 4,077,584
[45] Mar. 7, 1978

[54] SELF-REGULATING DEVICE FOR THE AUTOMATIC LOCKING OF SAFETY BELT WINDING REELS

[75] Inventor: Raymond Lafont, Paris, France

[73] Assignee: B.S.G. International Limited, Birmingham, England

[21] Appl. No.: 691,877

[22] Filed: Jun. 1, 1976

[30] Foreign Application Priority Data

Jun. 2, 1975 France .................................. 75 17179

[51] Int. Cl.² ........................ A62B 35/02; B65H 75/48
[52] U.S. Cl. ............................................. 242/107.4 A
[58] Field of Search ................. 242/107.4 R–107.4 E; 297/388; 280/744–747; 188/135–139; 180/82 C

[56] References Cited

U.S. PATENT DOCUMENTS

| 3,508,720 | 4/1970 | Kell | 242/107.4 A |
| 3,868,068 | 2/1975 | Heath | 242/107.4 A |
| 3,901,461 | 8/1975 | Stephenson et al. | 242/107.4 A |
| 3,940,083 | 2/1976 | Stephenson et al. | 242/107.4 A |

FOREIGN PATENT DOCUMENTS 2,420,549  2/1975  Germany ..................... 242/107.4 A

*Primary Examiner*—Stanley N. Gilreath
*Assistant Examiner*—John M. Jillions
*Attorney, Agent, or Firm*—Diller, Brown, Ramik & Wight

[57] ABSTRACT

A locking mechanism for a safety belt reel with a self-adjusting device which compensates for different orientations of the reel, particularly when installed in different vehicles. The locking mechanism includes a ball and bowl actuator for operating a lever which locks a toothed wheel mounted for rotation with the safety belt reel. A transmission element is positioned between a curved recess in the lever and the ball which rests on the bowl. A ball and socket joint forms an articulation between the lever and the ball on the bowl, the ball of the joint having a diametrical bore which slidably receives the transmission element. The base of the transmission element is disc-shaped to act as a bearing surface and as a weight for automatically orientating the articulation when the mechanism is installed. The articulation can be clamped in the optimum orientation.

13 Claims, 3 Drawing Figures

SELF-REGULATING DEVICE FOR THE AUTOMATIC LOCKING OF SAFETY BELT WINDING REELS

The invention relates to a self-regulating device for the automatic locking of safety belt winding reels.

The invention relates more particularly to locking devices automatically operated by inertia.

Safety belt winding reels for automobile vehicles must permit the winding and unwinding of belts subjected to regular traction, but they must also be locked instantaneously as soon as abnormal conditions of use occur, particularly in the event of abrupt deceleration or considerable inclination of the vehicle.

In winding reels existing at the present time use is made of the inertia of a pendulum or of a ball rolling in a bowl in order to operate a locking mechanism when the winding reel, which is rigidly fastened to the vehicle, is subjected to abnormal conditions of use.

Because of the sensitivity of the locking device, the mounting of the winding reel on the vehicle is a very delicate operation because the pendulum or ball of the device must be centered very accurately in order to avoid untimely locking during operation under normal conditions. Installation thus gives rise to great difficulties, particularly with regard to the initial adjustment of the device and the positioning of the winding reel when it is fixed on the body of the vehicle.

The solution adopted at the present time for facilitating this positioning consists in using special fittings adapted to each type of vehicle, thus making it possible to effect the centering of the pendulum or ball during the installation, but on the one hand this centering is only approximate and consequently there is a danger that the winding reel will be locked unnecessarily, while on the other hand it is not possible to standardize winding reels because of the special fittings required for various types of vehicles, which considerably increase the cost price.

The invention therefore relates to an automatic locking device which requires no special fittings adapted to the particular type of vehicle, and which despite rapid installation without special adjustment will always operate under optimum conditions whatever its positioning on the body of the vehicle, its tolerance in respect of inclination being very great and possibly exceeding 45° in relation to the vertical.

According to the invention the self-regulating device for the automatic locking of safety belt winding reels comprises an automatic control device of the inertia type which operates a winding reel locking mechanism with the aid of a transmission element disposed for sliding in an articulation carried by the said control device and centered in relation to the latter, the sliding axis of the said element assuming through gravity during installation a preferential optimum orientation in relation to the control device, which has means of locking the said articulation in order to retain this preferential orientation during use.

The invention will now be described in greater detail and with reference to one particular embodiment which is given by way of example without limitation and is illustrated in the accompanying drawings, in which.

Figure 1:
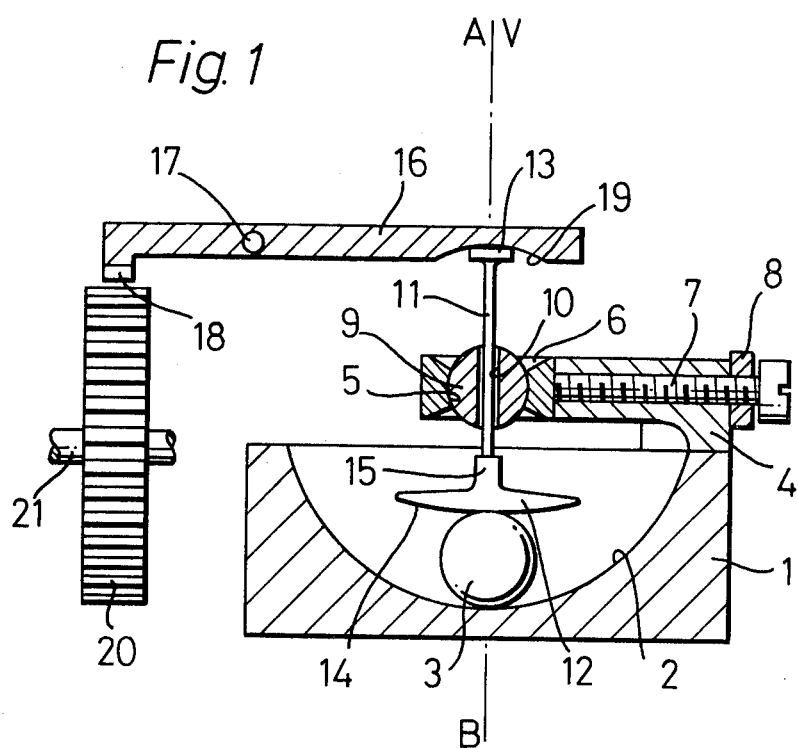
FIG. 1 is a longitudinal section of the device of the invention.
Figure 2:
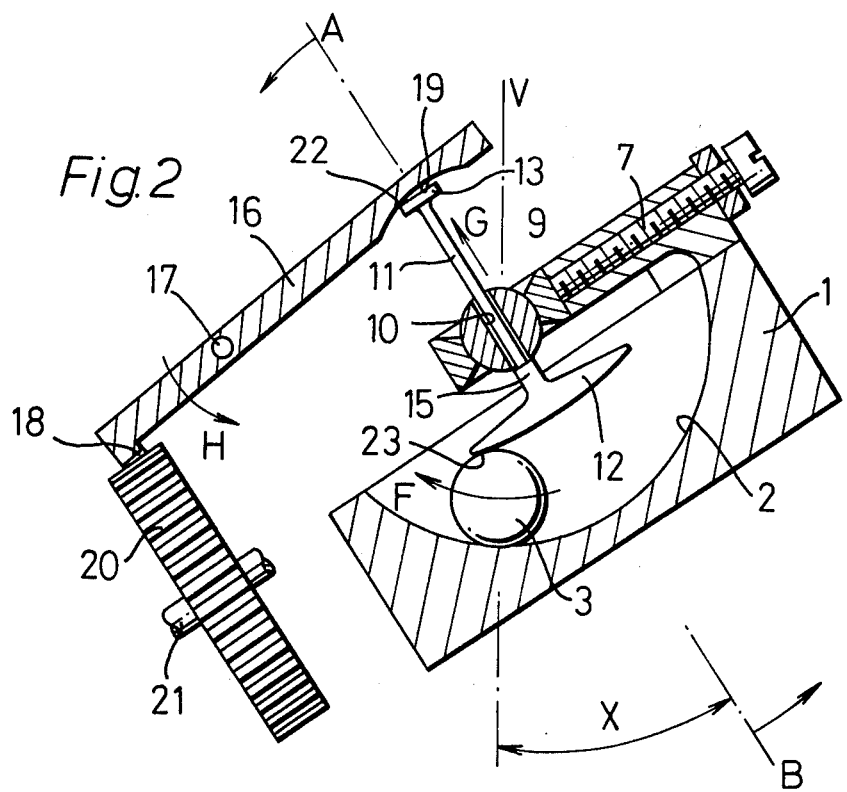
FIG. 2 is a section of the device in operation when a considerable inclination occurs.

The self-regulating device of the invention comprises (FIG. 1) a base 1 provided with a bowl 2 in the form of a spherical cap in which a ball 3 is free to roll, the ball being made of a material having a relatively high specific gravity, for example of steel, so that it has a fairly large mass with small dimensions. On the base 1 is fixed a part 4 extending above the spherical bowl 2 and provided, at the center of the latter, with a hollow spherical socket 5 housing a sphere 9, the assembly constituting a ball joint adapted to be locked in respect of rotation with the aid of a disc 6 having a hollow spherical face which matches the surface of the sphere 9 and is pushed against the latter by a screw 7 screwed into a tapped bore in the part 4 and locked by a lock-nut 8; the disc 6 is housed in a slot provided in the socket 5, in which it is adapted to slide in order to move towards or away from the sphere 9 as the screw 7 is screwed in or out. The slot housing the disc 6 also enables the sphere 9 to be introduced into its spherical socket 5 for assembly purposes, before the disc 6 is placed in position.

The sphere 9 has a diametrical bore 10 in which is adapted to slide the rod 11 of an element transmitting the movements of the control ball 3. At each end the rod 11 is provided with support discs 12 and 13 perpendicular to the axis of the rod, the disc 12 having a slightly curved face 14 in the form of a spherical cap of large radius, greater than the radius of the bowl 2, this curved face resting on the ball 3; the disc 13 has plane faces perpendicular to the rod 11.

It will be observed that the disc 12 has a stop shoulder 15 limiting the sliding movement of the rod 11 in the bore 10 in the sphere 9, so that, in conjunction with a sufficiently large diameter of the disc 12, the ball 3 is retained in the bowl 2 whatever the inclination of the device, the space separating the side edges of the disc 12 from the spherical wall of the bowl 2 not being sufficient to permit the passage of the ball 3.

The disc 13 bears against a concave surface 19 in the form of a spherical cap provided on one end of a lever 16 pivoting about a pin 17 fixed in relation to the base 1; this pin may be carried either by the base 1 or by the body of the vehicle. The other end of the lever is provided with a locking finger 18 in the shape of a wedge or gear tooth adapted to mesh in the teeth of a gearwheel 20 fixed on a shaft 21 connected to the winding or unwinding shaft of the winding reel.

The device described above functions in the following manner.

Figure 3:
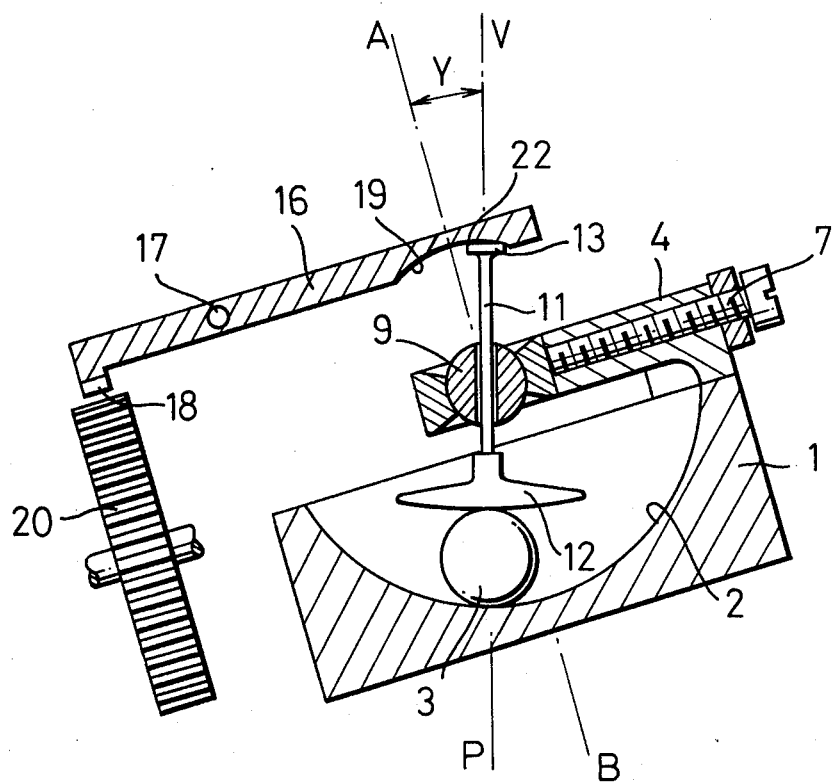
FIG. 3 is a section of the device at rest, mounted obliquely on the vehicle.

For installation purposes the articulation 5, 9 is previously unlocked by unscrewing the screw 7, and the device is then fixed on the body of the vehicle, either vertically as shown in FIG. 1 or with any inclination dictated by the fastening site, as shown in FIG. 3. The ball 3 occupies the lowest point of the bowl 2 under the action of its weight P (FIG. 3), and the rod 11 pivoting on its ball joint 5, 9 automatically assumes a position along a vertical axis V forming an angle Y with the axis AB joining the center of the bowl 2 to the center of the sphere 9 and to the center of the concavity 19 of the lever 16. The sphere 9 is then locked by screwing up the screw 7, which causes the locking disc 6 to bear against the said sphere, and the screw 7 is locked with the aid of the lock-nut 8. The apparatus is then ready to operate.

It will be assumed that the vehicle on which the winding reel equipped with the locking device is mounted undergoes a considerable inclination X (FIG.

2) or undergoes abrupt deceleration; the ball 3 is driven by inertia in the direction of the arrow F and takes up position at the lowest point of the bowl 2 in the case of an inclination, or rises through inertia along the wall of the bowl in the event of abrupt deceleration, thus causing the rod 11 to rise by sliding in the direction of the arrow G in the bore 10 of the sphere 9, and causing the lever 16 to rock in the direction of the arrow H, thus causing the finger 18 to engage in the teeth of the gear-wheel 20, which is thus locked and prevents the unwinding shaft of the winding reel from rotating.

When the abnormal condition of use of the vehicle ceases, that is to say when the vehicle is once again in equilibrium or when the deceleration ceases, the ball 3 returns to its position of rest at the lowest point of the bowl 2, and the rod 11 drops back to its low position. The lever 16 is then returned to its position of rest either through gravity because the arm having the concavity 19 is heavier than that carrying the finger 18, or by an elastic means such as a return spring (not shown); the pivoting of the lever 16 about the pin 17 releases the finger 18 from the teeth of the gear-wheel 20, which is thus freed, thereby unlocking the winding reel.

The locking and unlocking of the winding reel is thus achieved effectively by a simple, inexpensive device which on installation automatically regulates itself through gravity, and which consequently can be mounted in any horizontal or inclined position on the body of any type of vehicle, installation being rapid and considerably simplified.

Furthermore, the adjustment is perfect, requiring no checking, and optimum functioning of the winding reel is ensured when mounted on any type of vehicle, without any special additional fitting, thus enabling manufacture to be standardized.

The invention is obviously not limited to the single embodiment described above by way of example and of indication and without limitation, but it also covers all possible variants which differ only in respect of details or equivalent mechanical means.

Thus, in the particular embodiment the top end of the rod 11 is provided with a flat disc 13 arranged so that whatever the angle of inclination Y (FIG. 3) of the axis AB in relation to the vertical V when the device is fitted, the thrust zone 22 of the rod on the lever 16 remains near this axis AB, thus reducing the accuracy of machining required and at the same time making the couple applied to the lever and its displacement substantially constant; however, it is quite possible to conceive a rod 11 not having a disc at its end, the latter being applied directly against the concave face 19 of the lever 16.

Similarly, the ball joint 5, 9 can be replaced by any other equivalent multi-directional articulation, for example one based on the principle of the cardan joint.

Other locking means than the screw 7 and disc G may also be provided. Similarly the locking mechanism comprising the lever 16 and gear-wheel 20 may be replaced by an equivalent ratchet system.

Finally, the part 4 may very well be replaced by a lid completely closing the bowl 2 and having a spherical hollow socket centered on the geometrical center of the spherical cap 2, this cover retaining the ball 3 in the bowl 2 and protecting the latter against the penetration of foreign bodies which might damage the rolling surface of the ball or hinder its freedom of movement.

I claim:

1. A safety belt reel locking mechanism with a self-adjustment device to compensate for different orientations of said mechanism, said mechanism comprising support means, an inertial member mounted on said support means for movement in response to sudden movement; articulation means generally in overlying relation to said support means; means mounting said articulation means for free pivotal movement with respect to said support means, a transmission element slidably mounted on said articulation means and centered with respect thereto such that a sliding axis of said transmission element automatically assumes through gravity on installation of said device an optimum preferred orientation with respect to said support means; means for fixedly securing said articulation means in said optimum preferred orientation; and means responsive to the sliding movement of said transmission element due to said sudden movement for locking the safety belt reel.

2. A mechanism according to claim 1 wherein said support means is in the form of a part-spherical bowl; said inertial member being in the form of a ball which is free to roll in said bowl.

3. A mechanism according to claim 2 wherein said transmission element comprises a rod provided at each end with a bearing surface, said surfaces being respectively engaged with said ball and said means for locking the safety belt reel.

4. A mechanism according to claim 2 wherein said means for locking the safety belt reel comprises a lever, one end of said lever being in contact with said transmission element, the other end of said lever acting as a locking pawl for a toothed member driven by the safety belt reel; said one end of said lever and said bowl each having a curvature centered on said articulation means.

5. A mechanism according to claim 4 wherein said means for fixedly securing said articulation means in said optimum preferred orientation is rigidly secured to said support means.

6. A mechanism according to claim 5 wherein the end of said transmission element in contact with said ball is in the form of a plate extending substantially perpendicularly of said sliding axis.

7. A mechanism according to claim 6 wherein said plate has a spherical curvature of a radius greater than the curvature of said bowl.

8. A mechanism according to claim 7 wherein said articulation means comprises a second ball; and said mounting means is an annular socket receiving said second ball, said second ball having a diametrical bore in which said transmission element is slidably received.

9. A mechanism according to claim 8 wherein the annular socket is a split socket, and said means for fixedly securing said articulation means including means for urging the parts of said split socket together to clamp said second ball.

10. A mechanism according to claim 9 wherein said lever is biased to return to a static position in contact with said transmission element such that said locking pawl is normally out of locking engagement with the toothed member.

11. A safety belt retractor comprising a toothed member mounted for rotation with a safety belt storage reel, a pivoted lever having a pawl at one end for locking engagement with said toothed member and having a curved bearing surface at its other end; a part spherical bowl; an inertial member in the form of a ball which is free to roll on said bowl; a transmission element located between said ball and said curved bearing surface of said lever whereby sudden movement of said ball causes said pawl to lock said toothed member; a ball and socket joint forming an articulation support disposed between said curved bearing surface of said lever and said ball, the ball of said joint having a diametrical bore, said bore slidably receiving said transmission element, the end of said transmission element in contact with said inertial member including a disc extending transversely of the longitudinal axis of said transmission element, said disc being provided with a bearing surface for said inertial member and acting as a weight whereby the portion of said transmission element below said bore is heavier than the portion thereof above said bore whereby said ball of said joint automatically takes an optimum preferred orientation when said retractor is installed, the center of curvature of said bowl being located in said ball and socket joint; and means for fixedly securing the ball of said joint in said optimum preferred orientation.

12. In a locking mechanism of the type including a support, an inertial member mounted on said support for movement in response to sudden movement of said support, a latching member overlying said support, a transmission element, a guide member positioned between said support and said latching member, said transmission element extending between said inertial member and said latching member for moving said latching member to a latching position in response to movement of said inertial element relative to said support, said transmission member being elongated and having an axis, and said guide member guidingly mounted said transmission member for substantially axial movement only; the improvement residing in said guide member having a support mounting said guide member for free pivotal movement wherein said axis of said transmission member is free to automatically shift under the influence of gravity to one of preferred optimum orientation relative to said support and said latching member, and locking means for fixedly securing said guide member with said transmission member in said preferred optimum orientation.

13. The mechanism of claim 12 wherein said guide member is in the form of a ball and said guide member support is in the form of a socket, said ball having a centered bore therethrough receiving said transmission member.

* * * * *